United States Patent [19]

Yamada et al.

[11] Patent Number: 4,762,197
[45] Date of Patent: Aug. 9, 1988

[54] MOTORCYCLE

[75] Inventors: Toshiyuki Yamada, Saitama; Makoto Kitagawa, Tokyo; Toshio Kurihara, Saitama, all of Japan

[73] Assignee: Honda Giken Kogyo Kabushiki Kaisha, Tokyo, Japan

[21] Appl. No.: 916,163

[22] Filed: Oct. 7, 1986

[30] Foreign Application Priority Data

Oct. 8, 1985 [JP] Japan ............................. 60-222825
Oct. 11, 1985 [JP] Japan ............................. 60-224968

[51] Int. Cl.⁴ .......................................... B62D 61/02
[52] U.S. Cl. ................................. 180/219; D12/110; 296/37.1
[58] Field of Search ............... 296/37.1, 78.1, 198; D12/110, 109, 107, 158; 180/219, 218

[56] References Cited

U.S. PATENT DOCUMENTS

| | | | |
|---|---|---|---|
| D. 273,853 | 5/1984 | Kawashima et al. | D12/110 |
| D. 287,833 | 1/1987 | Moselli | D12/110 |
| 3,788,532 | 1/1974 | Bish | D12/158 |
| 4,441,574 | 4/1984 | Kohyama et al. | 180/219 |
| 4,650,204 | 3/1987 | Bothwell | 296/78.1 |

Primary Examiner—James T. McCall
Attorney, Agent, or Firm—Lyon & Lyon

[57] ABSTRACT

A motorcycle including twin seats consisting of a driver front seat and a rider rear seat and luggage containers each provided to both sides of a rear wheel. Outer surfaces of the luggage containers are continuously connected to side covers each for covering each side of a vehicle body at a forward location of the luggage containers, and concave portions are each formed at each side of the vehicle body by the luggage containers and the side covers. The concave portions are each provided with a rider footrest member. The luggage containers each comprise a container main body having an opening having an upwardly and inwardly extending peripheral edge with a bottom peripheral wall below the opening and a lid member intimately contacted with said opening to form the luggage container as a whole. The lid member is swingably pivotally attached to the main body through pivotally attaching means disposed to a lower periphery of the opening of the main body.

6 Claims, 5 Drawing Sheets

MOTORCYCLE

BACKGROUND OF THE INVENTION

The field of the present invention is motorcycle layout and design including seat and luggage container design.

In motorcycles employing luggage containers to either side of the rear wheel, a substantial portion of the upper half of the rear wheel is often covered by the luggage containers and the containers block water, mud, etc. from being splashed outwardly from the rear wheel. However, such structures typically have gaps or spaces between each of the luggage containers and the vehicle body side covers forwardly of the luggage containers. Due to the foregoing, water and mud splashed by the rear wheel may splash out through the space between the luggage container and the side cover to make the front surfaces of the luggage containers or side covers dirty.

SUMMARY OF THE INVENTION

One object of the present invention is to prevent, in motorcycles having luggage containers disposed on both sides of a rear wheel, splashing of the front surfaces of the luggage containers, the vehicle body covers or riders with water, mud, etc. from the rear wheel.

This object may be achieved by continuously connecting the luggage containers disposed to both sides of the rear wheel on such a motorcycle with right and left side covers for covering both sides of the vehicle body. Rider footrests may be located in the concave portion formed by the luggage container and the side cover at each side of the vehicle body.

Further, according to the present invention, there may be provided motorcycles having luggage containers of large effective capacity.

The above and other objects and features of the present invention will become more manifest from the following description with reference to the accompanying drawings.

DETAILED DESCRIPTION OF THE PREFERRED EMBODIMENTS

One embodiment of the present invention will be described hereunder with reference to the accompanying drawings.

A vehicle frame 12 of a motorcycle 10 is installed with an engine E situated between a front wheel FW and a rear wheel RW. At an upper location of the engine E, a fuel tank T is disposed. At a rearward location of the fuel tank T, a tandem seat or twin seats consisting of a driver's front seat $S_1$ and a rider's rear seat $S_2$.

Figure 1:
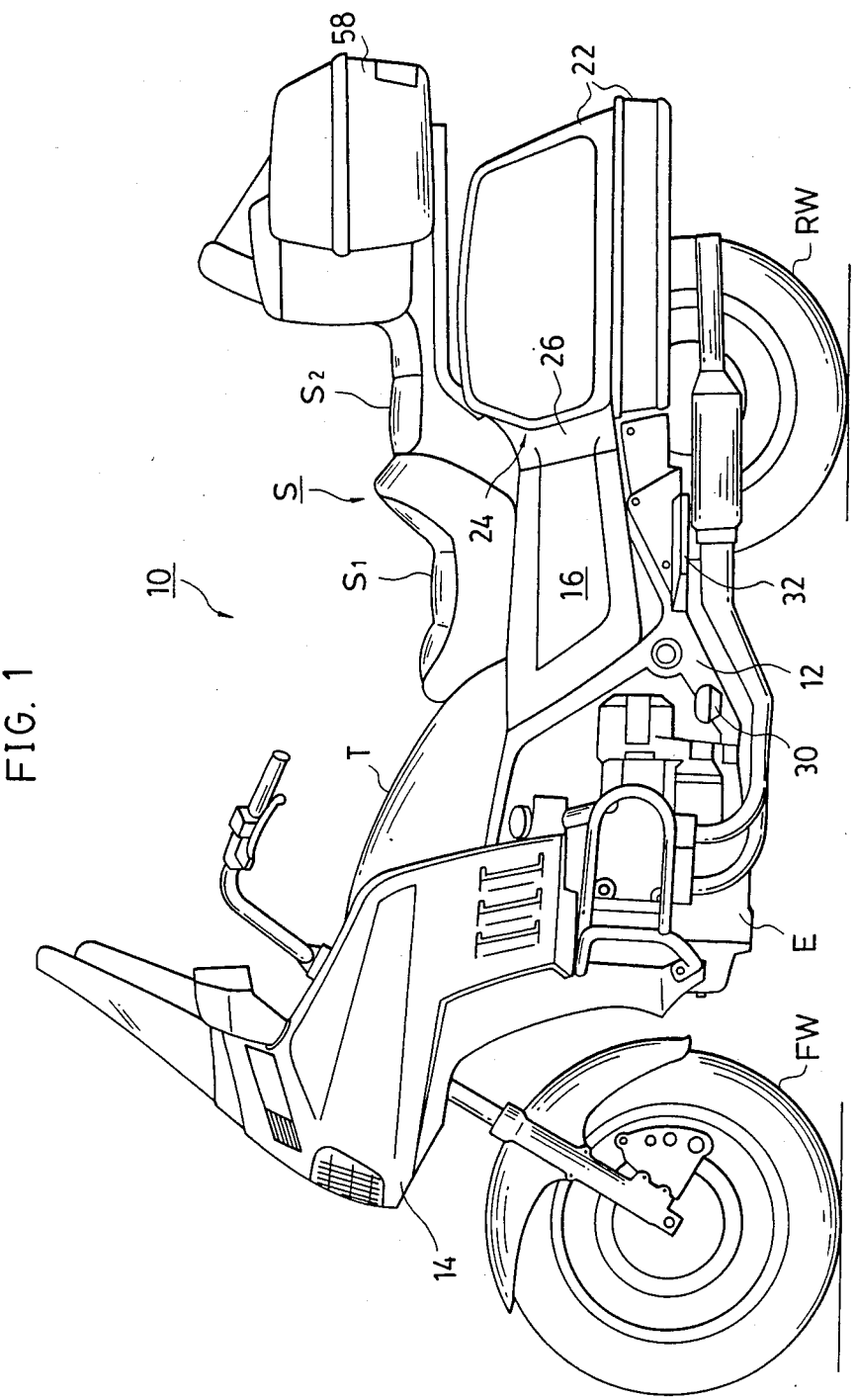
FIG. 1 is a side view of a motorcycle according to the present invention.
Figure 2:
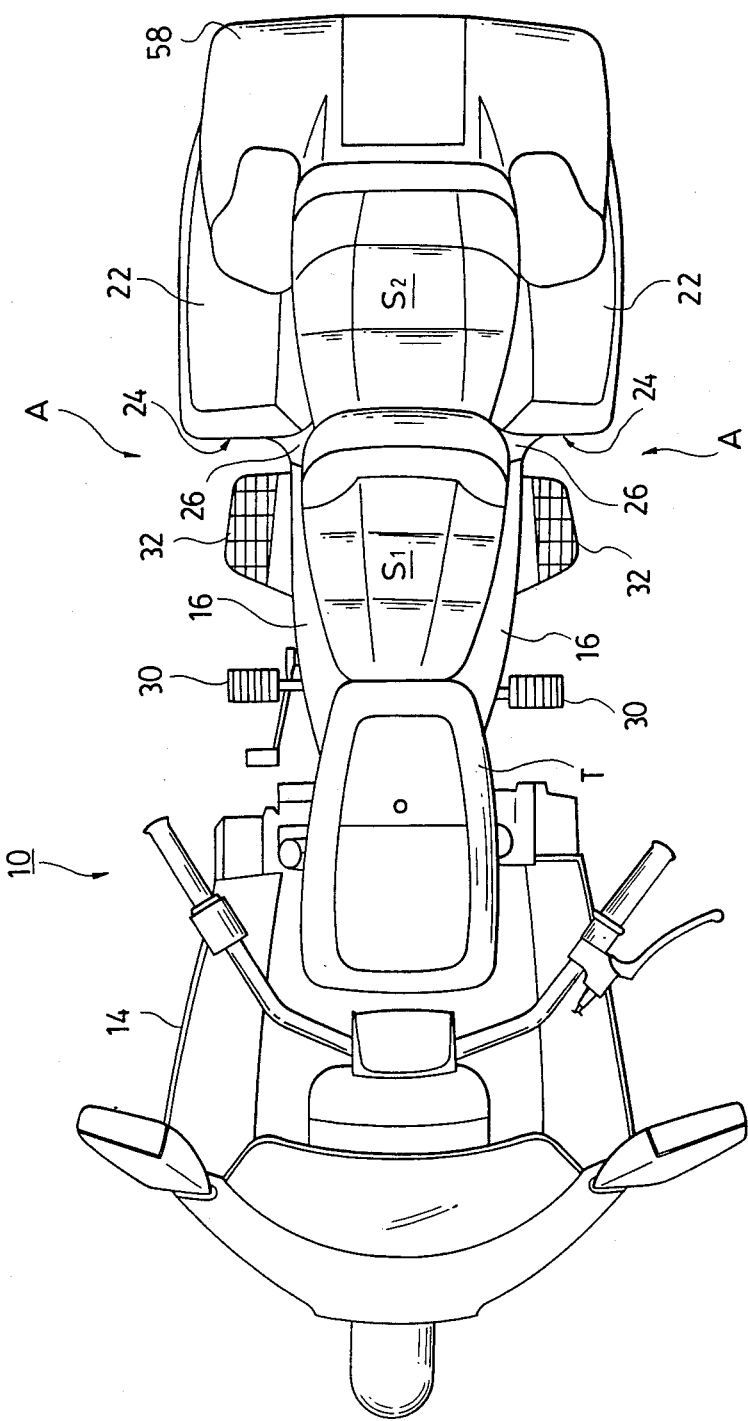
FIG. 2 is a plan view thereof.
Figure 3:
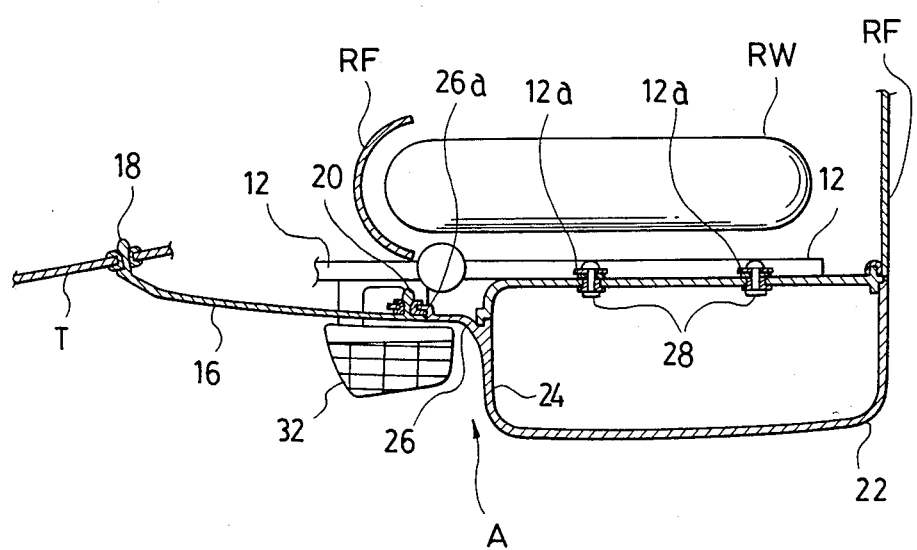
FIG. 3 is a partial horizontal sectional view of the above-mentioned motorcycle.

The body of the motorcycle 10 has a front fairing 14 and right and left side covers 16. Upper half side portions of the rear wheel RW are covered by luggage containers 22. The luggage containers 22, as shown in FIG. 3, are each secured to plate pieces 12a projecting from the vehicle frame 12 by rivets 28. RF denotes a rear fender. The luggage containers 22 are each provided with a branched wall 26 extending forward from the front wall 24. A front end periphery of the branched wall 26 is warped inwardly to form a shoulder portion 26a. Each side cover 16 is firmly secured to the fuel tank T and the respective luggage container 22 by removably fitting a projection 18 at its front end portion into a hole formed in a lower end peripheral portion of the fuel tank T and a projection 20 at its rear end portion into a hole formed in the shoulder portion 26a of the branched wall 26. An outer surface of the side cover 16 and an outer surface of the branched wall 26 are smoothly continued to form a common plane. As shown in FIGS. 2 and 3, a concave portion A is formed at each side of the vehicle body by the front wall 24 of the luggage containers 22, the branched wall 26 thereof and the side covers 16.

Disposed to positions sideward of the engine E are driver right and left footrests 30 projecting from the vehicle body 12. Disposed to positions upward and rearward of the driver footrests 30 are rider right and left footrests 32 likewise projecting from the vehicle body 12. Each of the rider footrests 32 is positioned at each of the concave portions A. The areas for the rider to rest his feet are made larger than the driver footrests 30.

In this embodiment, as mentioned in the foregoing, each luggage container 22 and side cover 16 are mutually continuously connected through the branched wall 26 projecting from the front wall 24 of the luggage container 22. As a result, the upper half portion of the rear wheel RW is completely covered up. Accordingly, even if water, mud, etc. are splashed by the rear wheel RW when driving in the rain, the splashes will never reach concave portion A. Accordingly, the outer surface of each luggage container 22 and side cover 16 can be effectively prevented from getting dirty. In addition, the lower legs and feet of the rider resting on the rider footrests 32 also will be protected from rear wheel splashing.

Further, since the upper half portion of the rear wheel RW and various parts disposed in the vicinity thereof cannot be seen from outside of the vehicle body, the outer appearance of the vehicle body is improved in association with the beauty obtained by forming the side cover and the luggage container continuously.

Although the side cover 16 and the luggage container 22 are separately formed in this embodiment, the side cover may be formed by further greatly extending the branched wall 26, thereby enabling to reduce the number of component parts and to eliminate labors required for assembling the parts.

Figure 4:
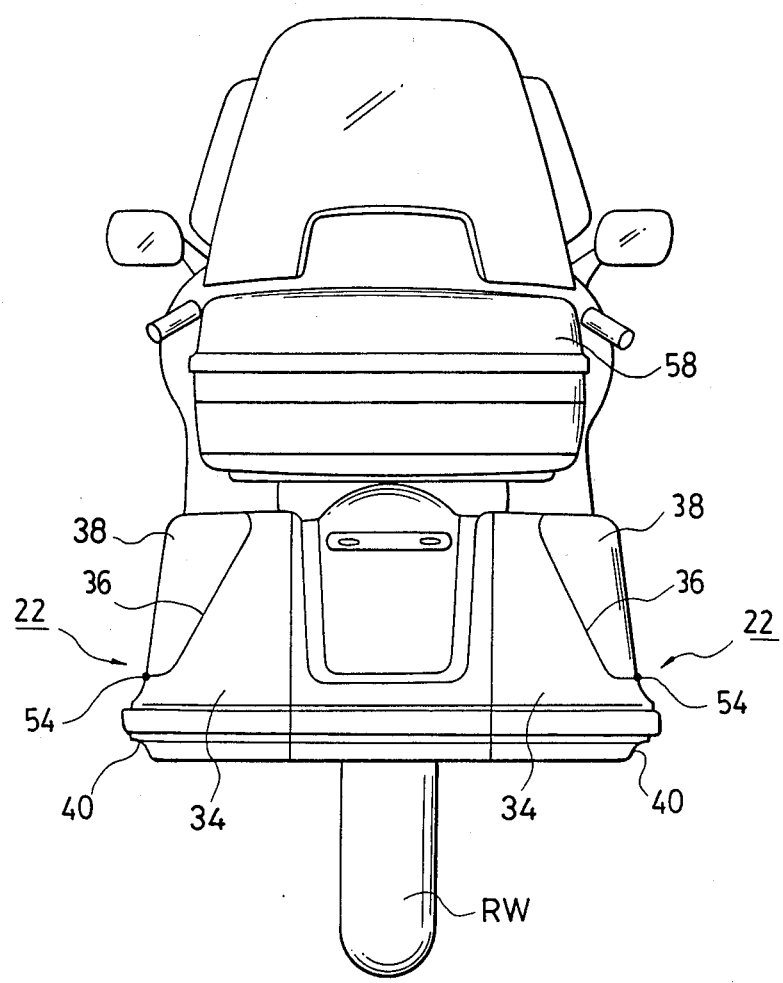
FIG. 4 is a rear end view of the motorcycle of FIG. 1.

Next, the detailed structure of the luggage containers 22 will be described with reference to FIGS. 4 and 5. Each luggage container 22 comprises a container main body 34 firmly secured to the vehicle body frame 12 and a lid member 38 for covering an opening 36 of the container main body 34. The opening 36 faces upwardly and outwardly of the vehicle as can best be seen in FIGS. 4 and 5. The lid member 38, when closed in place in the opening 36, cooperates with the main body 34 to complete the luggage container 22. A bottom peripheral wall 40 of the container main body 34 is integrally formed with two upper and lower series of projections 42 and 44 projecting outward and a concave groove 46 disposed therebetween. The concave groove 46 is fitted with a protector 48 made of an elastic member such as rubber, etc.

An upper periphery 36a of the opening 36 of the container main body 34 is formed with a retaining concave portion 50. The retaining concave portion 50 is fitted with a seal rubber 52. Firmly secured to a lower periphery 36b of the opening 36 of the container main body 34 is one side piece 54a of a hinge 54 having a swinging axis in the fore and aft direction of the vehicle. The other side piece 54b of this hinge 54 is firmly fixed with a lower periphery 38b of the lid member 38. Accordingly, the lid member 38 is pivotally attached to the container main body 34 by the hinge 54. An upper periphery 38a of the lid member 38 is provided with an engaging projection 56 detachably engageable with the retaining concave portion 50.

Since the luggage container 22 is constructed as mentioned above, when an upper portion of the lid member 38 is pulled outwardly from a closed state when the engaging projection 56 of the lid member 38 retained in the retaining concave portion 50 of the container main body 34, the engaging projection 56 of the lid member 38 is disengaged from the retaining concave portion 50 of the main body 34, and the lid member 38 will swing outward about the hinge 54 to open the container 22. Since the lid member 38 is generally horizontally swung about the lower periphery 36b of the opening 36 of the container main body 34, the upper periphery 38a of the lid member 38 does not swing upwardly to any great degree. Accordingly, even if a trunk 58 is located above the luggage container 22, the lid member 38 can be opened and closed without being caught by the trunk 58.

Figure 5:
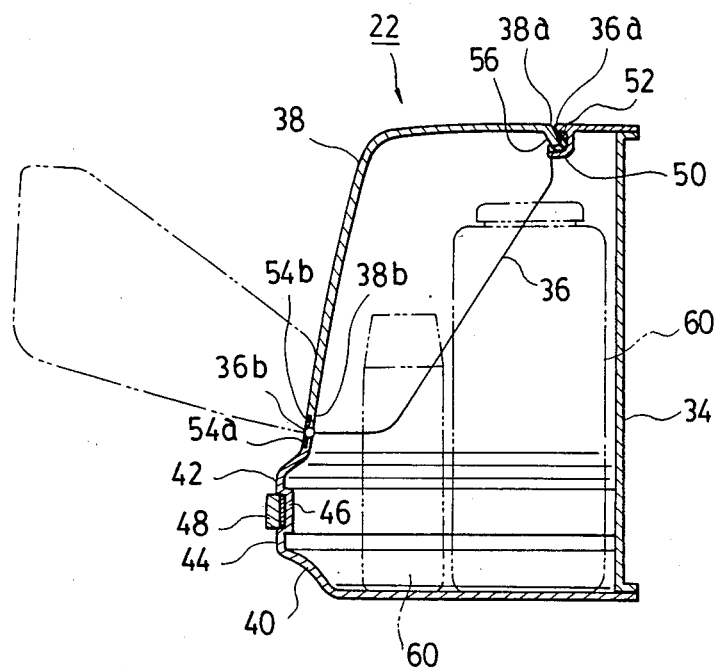
FIG. 5 is a cross-sectional view of a luggage container.

Further, since the container main body 34 has the bottom peripheral wall 40 along its entire periphery, even when the lid member 38 is open and vertically elongated luggage 60 is contained in the luggage container 22 as shown in FIG. 5, the luggage 60 will not fall outwardly or drop. Thus, the effective capacity of the luggage container 22 is increased.

Since the bottom peripheral wall 40 of the luggage container 22 is formed with the two upper and lower series of projections 42 and 44 and the concave groove 46 disposed therebetween, the bottom peripheral wall may be strong and rigid. Moreover, since the concave groove 46 is fitted with a protector having sufficient elastic properties, the bottom peripheral wall 40 is protected from shocks, etc. from outside.

Figure 6:
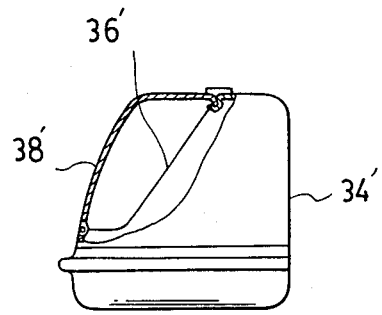
FIG. 6 is a side view, partly in section, of a luggage container according to another embodiment.

FIG. 6 illustrates a modified embodiment of the abovementioned luggage container. The figure is a side view of the luggage container. In the figure, it is understood that the right side is forward and the left side is backward. In this modified embodiment, an opening 36' of a luggage container main body 34' is opened up rearwardly on the vehicle. A lid member 38' is swung fore and aft to open and close the opening 36'.

Thus, an improved motorcycle structure and arrangement is disclosed. While embodiments and applications of this invention have been shown and described, it would be apparent to those skilled in the art that many more modifications are possible without departing from the inventive concepts herein. The invention, therefore, is not to be restricted except on the spirit of the appended claims.

What is claimed is:

1. In a motorcycle having a frame extending longitudinally between a front wheel and a rear wheel, an engine carried by said frame intermediate said front wheel and said rear wheel, a fuel tank above said engine and a seat disposed rearwardly of said fuel tank, the improvement comprising:
    laterally spaced luggage containers attached to said frame on opposite sides of said rear wheel; and
    a side cover extending forwardly from each of said luggage containers, each said side cover having a forward end engaging said fuel tank and a rear end engaging said luggage container.

2. The improvement as claimed in claim 1, wherein said luggage containers and said side covers are integrally formed.

3. The improvement according to claim 1 in which each said side cover cooperates with the forward portion of each said luggage container to define a concave portion at the nexus between said side cover and said luggage container; and a rider footrest disposed in each said concave portion.

4. A motorcycle having a rear wheel, comprising
    twin seats including a driver front seat and a rider rear seat;
    luggage containers provided to either side of the rear wheel;
    side covers forwardly of said luggage containers, the outer surfaces of said luggage containers being continuously connected to said side covers, the forward portions of said luggage containers defining concave portions each formed at the side of the motorcycle adjacent said side covers;
    driver footrests disposed forward of each said concave portion; and
    rider footrests disposed in each said concave portion, said rider footrests being disposed to positions upward and rearward of said driver footrests and made larger than said driver footrests.

5. A motorcycle having a rear wheel, luggage containers disposed on each side of said rear wheel and a trunk located above said luggage containers, said luggage containers each comprising:
    a container main body having an opening inclined upwardly and forwardly from the rear end thereof and a lid member fitted to said opening, said lid member being pivotally attached to said main body about an axis at the lower periphery of the opening of said main body.

6. The motorcycle of claim 5, wherein said main body includes upper and lower projections with a concave groove disposed therebetween extending about the lower outer periphery of said main body.

* * * * *